(12) United States Patent
Kimbrell et al.

(10) Patent No.: US 8,325,494 B2
(45) Date of Patent: Dec. 4, 2012

(54) UNIVERSAL MOUNTING BRACKET

(75) Inventors: Eddie Kimbrell, Dacula, GA (US); Ted Lichoulas, Simpsonville, SC (US)

(73) Assignee: AFL Telecommunications LLC, Spartansburg, SC (US)

(*) Notice: Subject to any disclaimer, the term of this patent is extended or adjusted under 35 U.S.C. 154(b) by 206 days.

(21) Appl. No.: 12/811,453

(22) PCT Filed: Jan. 5, 2010

(86) PCT No.: PCT/US2010/020107
§ 371 (c)(1),
(2), (4) Date: Jul. 1, 2010

(87) PCT Pub. No.: WO2010/078574
PCT Pub. Date: Jul. 8, 2010

(65) Prior Publication Data
US 2011/0043977 A1 Feb. 24, 2011

Related U.S. Application Data

(60) Provisional application No. 61/142,417, filed on Jan. 5, 2009.

(51) Int. Cl.
*H05K 7/02* (2006.01)
*H05K 7/04* (2006.01)

(52) U.S. Cl. .................. 361/807; 361/810; 361/803
(58) Field of Classification Search .......... 361/800–803, 361/807–810
See application file for complete search history.

(56) References Cited

U.S. PATENT DOCUMENTS

| | | | |
|---|---|---|---|
| 4,582,960 A * | 4/1986 | DeLuca et al. ............ 379/27.07 |
| 6,139,333 A * | 10/2000 | Green et al. .................... 439/49 |
| 6,560,334 B1 * | 5/2003 | Mullaney et al. ........ 379/413.04 |
| 2003/0199201 A1* | 10/2003 | Mullaney et al. ............. 439/676 |
| 2004/0062508 A1* | 4/2004 | Blankenship et al. ........ 385/134 |
| 2004/0264687 A1* | 12/2004 | Casey et al. ............. 379/413.02 |
| 2005/0145522 A1* | 7/2005 | Bloodworth et al. ......... 206/409 |
| 2005/0220421 A1* | 10/2005 | Keenum et al. ................ 385/62 |
| 2005/0289632 A1* | 12/2005 | Brooks et al. ................. 725/126 |
| 2008/0090454 A1* | 4/2008 | Hoath et al. ............... 439/540.1 |
| 2011/0134937 A1* | 6/2011 | Lichoulas et al. ............ 370/463 |

* cited by examiner

*Primary Examiner* — Hung S Bui
(74) *Attorney, Agent, or Firm* — Sughrue Mion, PLLC

(57) ABSTRACT

Provided is a universal adapter bracket, the bracket including a first portion containing at least two mounting elements, and the at least two mounting elements engage with a base unit of a network module to configure the base unit within the first portion of the bracket; and a flange, wherein flange engages with an add-on module. The bracket is mounted within a network interface device (NID) to interface the base unit and one or more add-on modules with the NID.

27 Claims, 17 Drawing Sheets

Figure 3 (Related Art)
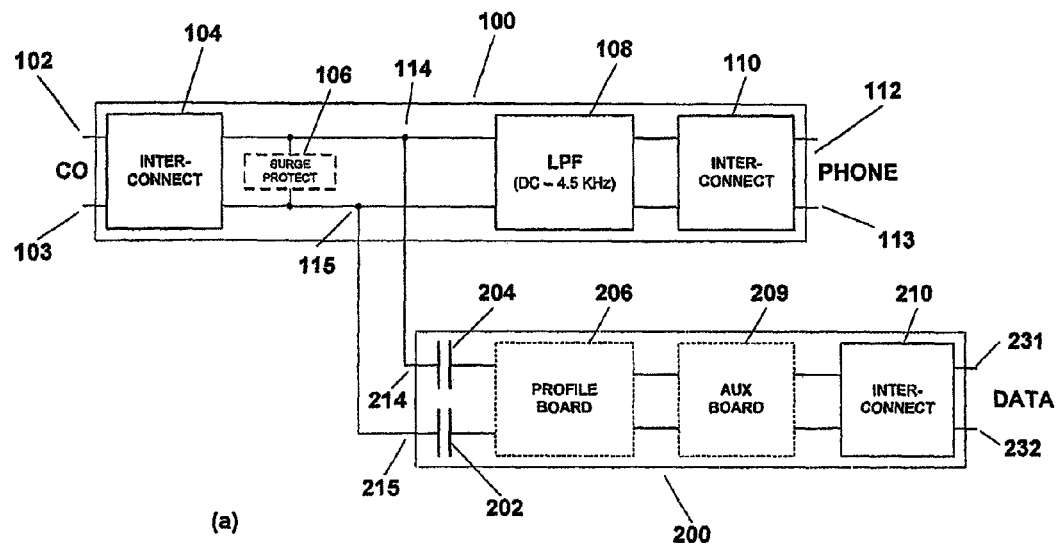
(a)
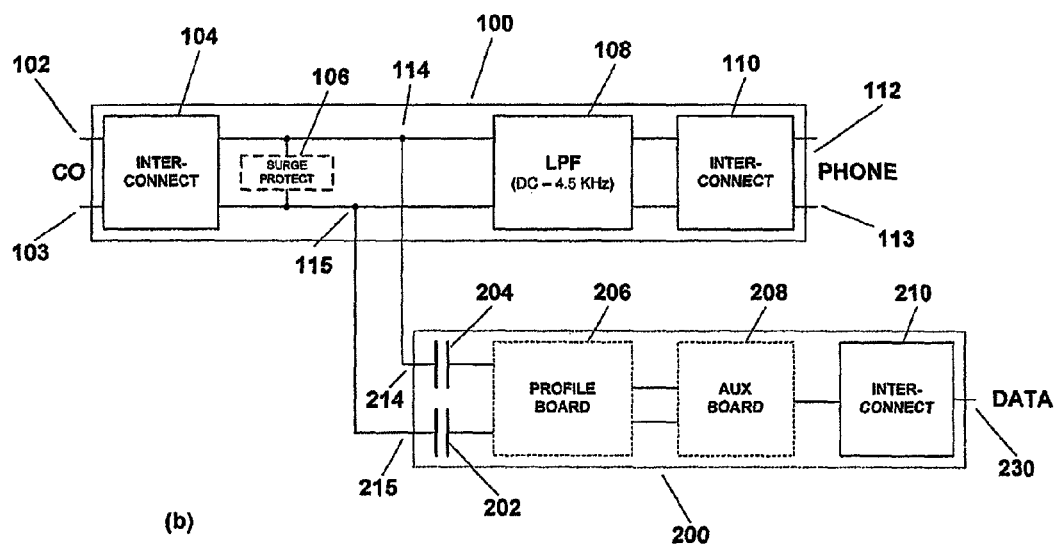
(b)

Figure 5
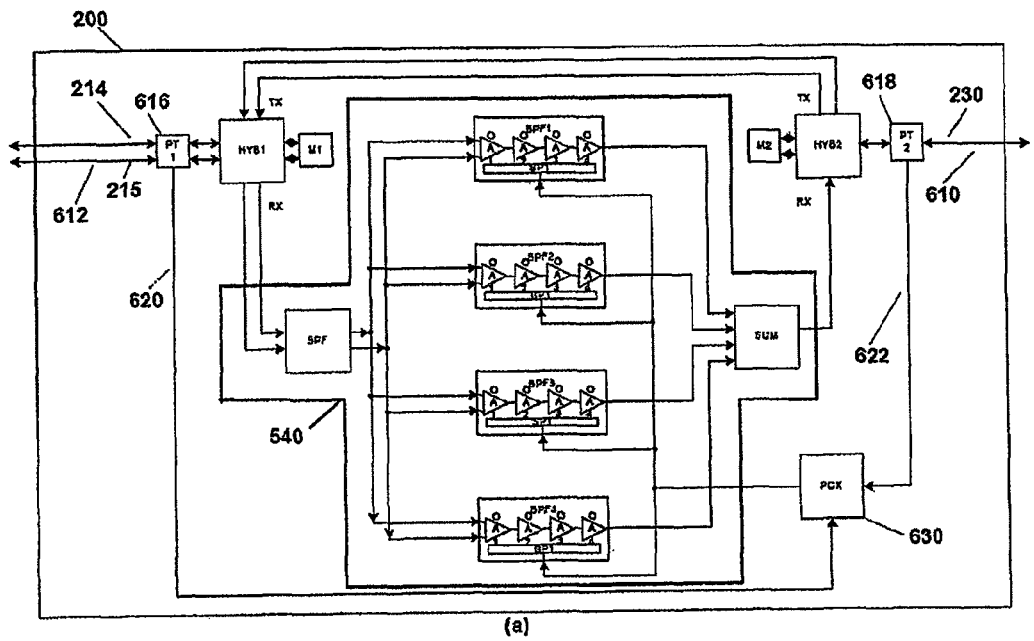
(a)
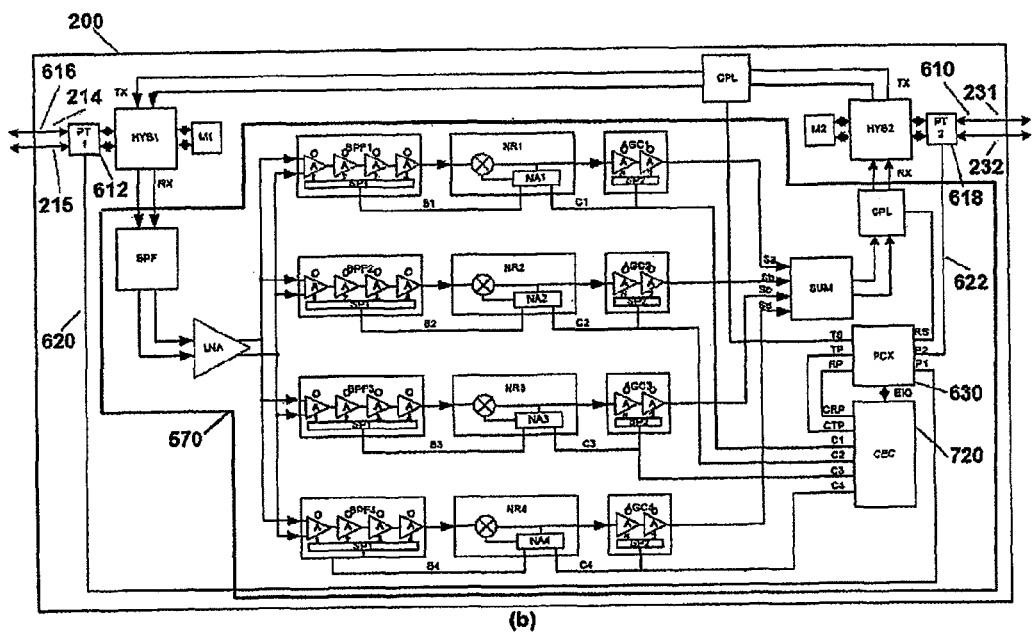
(b)

Figure 6
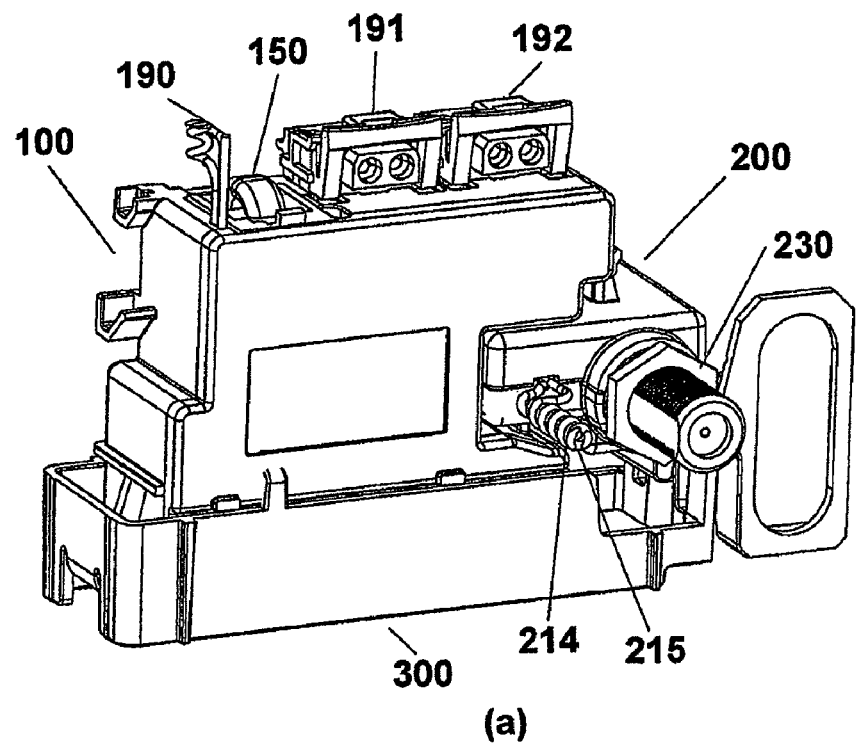
(a)
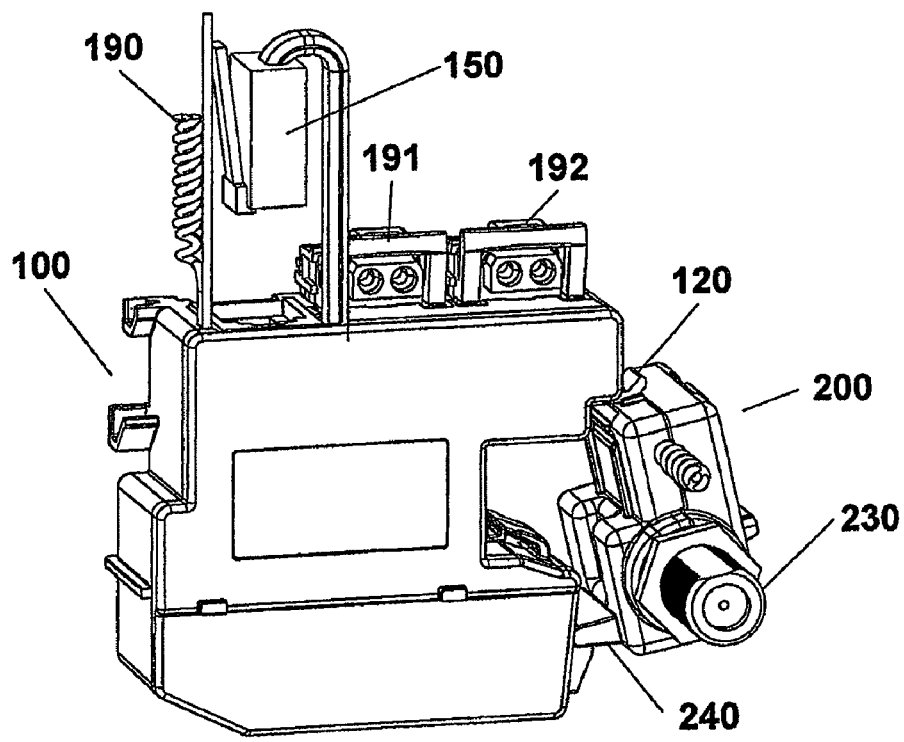
(b)

UNIVERSAL MOUNTING BRACKET

CROSS-REFERENCE TO RELATED APPLICATIONS

This application claims priority from Patent Cooperation Treaty Application No. PCTUS2009/002489, which claims priority from U.S. Provisional Patent Application No. 61/046,825 filed Apr. 22, 2008 the disclosure of which is incorporated herein by reference in its entirety. This application also claims priority from U.S. Provisional Patent Applications No. 61/081,430, filed Jul. 17, 2008; and No. 61/142,417, filed Jan. 5, 2009, in the United States Patent and Trademark Office, the disclosures of which are incorporated herein by reference in their entirety.

BACKGROUND

1. Field of the Invention

Methods and apparatuses consistent with the present invention relate to a universal mounting bracket which can be used to mount a base unit and an add-on module within a single line space of a network interface device (NID). Thus, the flexibility to orient the base unit provided by the universal mounting bracket allows the base unit to be installed in various styles of NIDs.

2. Description of the Related Art

A demarcation point, referred to as a network interface device (NID), is typically provided between a telephone subscriber's premises line and an incoming line from a telephone service provider, and is commonly mounted to a pole or outside wall of the subscriber's premises. However, a demarcation point may also be located, for example, at a wall plate of a distribution panel within a communications room on the ground floor of a Multi Dwelling Unit (MDU).

The NID enclosure can include a base section that is secured to a subscriber's premises, and to which a telephone subscriber line module is affixed. An interface device or module, typically mounted within an NID for physically connecting a telephone subscriber line with a telephone service provider line, is referred to as a "subscriber line module" or "subscriber bridge." Telephone service provider lines enter the NID enclosure and are connected to the telephone line of a subscriber's premises via a subscriber line module.

With the advent of a digital subscriber line (DSL) and very high speed DSL (VDSL) services, the telephone subscriber may have multiple services, such as telephone, Internet, or cable television, supplied on a single line or cable from the telephone company. In these situations, the NID becomes more complex in that it must contain circuitry to separate the signals of different frequencies coming in from the telephone company on a single line into signals for the subscriber's telephone, television, and Internet signals.

A variety of related art interface modules are available to meet these needs. These modules are usually of a standard shape that "snap" into the NID enclosure. However, as the number of interface modules in an NID enclosure becomes larger, for example, when a larger number of connections are needed to provide multiple services, the wiring inside the NID can become unwieldy.

Likewise, the interface modules and NIDs are sold by many different manufacturers. Accordingly, these modules may have different physical footprints and may not be easily adaptable to interact with other modules or the NID. For example, interface modules and NIDs are available with AFL Keptel or "K" footprint, AFL Seicor or "S" footprint, Tyco "K" footprint, Tyco "S" footprint, Corning Cable Systems "S" footprint, and Corning Cable Systems "Universal" footprint. Each type requires an interconnect scheme and splitter module of different physical shape.

Also, many service providers have deployed three-line space NIDs and have populated these NIDs with two line modules or interface module which occupy two line spaces in order to provide telecommunications service. Related art interface modules require at least two line spaces, thereby reducing the number of line spaces available for additional services or for future expansion. However, related art technology does not provide the capability for expansion of features or customization as part of an interface module. For example, adding a balanced two (2) wire differential circuit conversion to an unbalanced coaxial single-ended circuit would require installing a completely new device. Related art modules are either a stand alone splitter-filter module or a combination splitter-filter-balun module. These modules are not field upgradeable and must be replaced at considerable expense both in parts and skilled labor if, for example, the profile filtering or output connectivity required adjustment, re-configuration or replacement. Another option is to replace the NID itself with a larger unit, which is also expensive and inefficient.

Related art interface modules do not provide a way to attach auxiliary modules within one line space, that may be required for the addition of associated hardware, mechanical network system customization, security features. For example, related art splitter modules do not provide an add-on means to use alternate connector types. Instead, several specific splitter modules have been developed that employ the coaxial "F" connector style.

In addition, related art splitter modules are not mechanically or electrically modular in nature. Therefore, they do not allow for field configuration of xDSL profile filtering, system enhancements, or interconnect variations, while taking up only a single line space in the NID.

The vast majority of related art splitter-filter modules employ screw terminals to make connections at the demarcation point, requiring special tools, extra labor by skilled technicians and occupying excess space within the NID.

xDSL splitter, filter and signal conditioning devices may also be located at the NID interconnect point. xDSL refers collectively to data transmission methods such as, ADSL, ADSL2, ADSL2+, VDSL, VDSL2 and SHDSL, as described in ITU-T G.993.2, G.992.1, G.992.3, G. 992.5, G.993.1, and G.991.2, which are hereby incorporated by reference in their entirety.

xDSL profiles relate to specific frequency plans, power spectral density (PSD), modulation schemes, noise mitigation techniques, and data rates for transmission of data within a POTS system employing an unshielded twisted pair (UTP) wire, but are not limited to this transmission medium and are, on occasion, deployed using coaxial cable (COAX), multi-pair Ethernet cable or a combination of media.

Over the years a variety of NID enclosures have been fielded with each model having differing physical configurations and orientations. In response, a very large number of physically different xDSL devices have been created to fit within a specific NID model. Additionally, each device created for a specific model has several versions to support each xDSL profile, and each of these devices has associated enhancement modules. Thus, a large number of physically different xDSL devices are required to support the many NID installations currently deployed in the field.

With respect to splitter modules, related art splitter-filters are only matched to one xDSL profile, are constructed as a single fixed dual slot unit (i.e. consume 2 line spaces within an NID), and cannot accommodate reconfigurations or add-on enhancements. Thus, as the xDSL system develops or is modified to use an additional xDSL profile, the related art splitter modules must be physically replaced with a second module matched to the second xDSL profile. The need for multiple xDSL splitters, each matched to a specific xDSL profile as well as the NID significantly increases the cost of operating and maintaining an xDSL system.

SUMMARY

Aspects of the present invention provide at least two arrangements or positions for arranging a base unit of a network module within a universal mounting bracket in locations from left to right inside a network interface device (NID), and provide options for a field technician to facilitate the installation of a coax cable connection.

According to an aspect of the present invention, there is provided a universal adapter bracket which includes a first portion containing at least two mounting elements, wherein the at least two mounting elements engage with a base unit of a network module to configure the base unit within the first portion of the bracket; and a flange, wherein flange engages with an add-on module. The bracket is mounted within a network interface device NID to interface the base unit and the add-on module with the NID.

The bracket may occupy a single line space of the NID, and may mount the base unit and add-on module within the single line space.

The first portion of the bracket may be configured to receive the base unit in one of at least two orientations arranged within the first portion.

The at least two mounting elements may include a first cross bar and a first snap hook. According to one exemplary embodiment, the first cross bar is removable from the bracket. The first snap hook may be disposed on an inner wall of a first transverse side of the first portion, and the first cross bar may be disposed substantially parallel to the first transverse side.

According to another exemplary embodiment, in addition to the first cross bar and the first snap hook, the bracket may also include a second cross bar and a second snap hook, wherein the first and the second cross bar are both configured to be removable from the bracket, and either the first or the second cross bar is removed from the bracket upon mounting the base unit within the first portion.

The bracket engages with at least one add-on module. The flange may engage with one add-on module, a main body of the base unit may be connected to another add-on module. In addition, the at least one add-on module is electrically connected to the base unit in one of a series connection configuration and a parallel connection configuration. The add-on module and the other add-on module are electrically connected to the base unit in one of a series connection configuration and a parallel connection configuration, such that, in the series connection configuration, the base unit, the e add-on module and the other add-on module are connected in series, and, in the parallel connection configuration, the add-on module and the other add-on module are independently connected to the base unit in parallel.

The bracket is mounted within a network interface device (NID) to interface the base unit and the at least one add-on module with the NID. Accordingly, the bracket occupies a single line space of the NID, and mounts the base unit, the add-on module and the other add-on module within the single line space.

The add-on module may be coupled to the base unit of the network module.

The flange may be detachable from the first portion.

The flange may also be configured to vertically adjust a position of the add-on module with respect to the base unit. In particular, a connector of the add-on module may be inserted into an open slot of the flange.

In addition, an upper portion of the flange may be configured to be removable from a remaining portion of the flange.

According to another aspect of the present invention, there is provided a universal adapter bracket which includes a first portion comprising mounting elements including a first snap hook, a second snap hook, a first removable crossbar and a second removable crossbar, wherein the first snap hook faces the first removable crossbar and the second snap hook faces the second crossbar, wherein the mounting elements engage with a base unit of a network module to configure the base unit within the first portion of the bracket, one of the first and second crossbars are removed in order to mount the base unit within the first portion of the bracket, and the bracket is mounted within a network interface device (NID) to interface the base unit with the NID.

The first snap hook may be disposed on an inner wall of a first transverse side of the first portion, and the second snap hook may be disposed on an inner wall of a second transverse side of the first potion, where the second transverse side is located opposite to the first transverse side. Also, the first and second removable crossbars may be disposed substantially parallel to the first transverse side, the first removable crossbar being disposed closer to the first transverse side than to the second transverse side, and the second removable crossbar being disposed closer to the second transverse side than to the first transverse side.

According to an exemplary embodiment, when the first removable crossbar is removed from the first portion and the second removable portion remains, the first snap hook and the second removable crossbar engage with the base unit to fix the base unit to the first portion of the bracket. On the other hand, when the second removable crossbar is removed from the first portion and the first removable crossbar remains, the second snap hook and the first removable crossbar engage with the base unit to fix the base unit to the first portion of the bracket.

Furthermore, when the first removable crossbar is removed from the first portion and the second removable portion remains, the second removable crossbar engages with a catch element of the base unit, such that the catch element is engaged underneath the second removable crossbar, and the first snap hook engages with a rib element of the base unit, such that the rib element is engaged underneath the first snap hook. On the other hand, when the second removable crossbar is removed from the first portion and the first removable crossbar remains, the second snap hook engages with the catch element of the base unit, such that the catch element is engaged underneath the second snap hook, and the first removable crossbar engages with the rib element of the base unit, such that the rib element is engaged underneath the first removable crossbar.

According to another aspect of the present invention, there is provided a universal adapter bracket which includes a first portion containing at least four mounting elements including a first mounting element, a second mounting element, a third mounting element and a fourth mounting element, wherein the first and the second mounting elements are disposed substantially parallel to transverse sides of the first portion, each transverse side respectively containing the third and the fourth mounting elements, and wherein at least two of the first, second, third and fourth mounting elements engage with a base unit of a network module to configure the base unit within the first portion of the bracket. The first and second mounting elements are removable, and one of the first or second mounting elements is removed from the bracket to configure the base unit into one of two positions within the first portion of the bracket.

The bracket may be mounted within a single line of a network interface device (NID) to interface the base unit with the NID.

The bracket may also include a flange that configures an add-on module within the bracket, and the bracket may be mounted within a single line of a network interface device (NID) to interface the base unit and the add-on module with the NID.

BRIEF DESCRIPTION OF THE DRAWINGS

The aspects of the present invention will become more apparent by describing in detail examples of embodiments thereof with reference to the accompanying drawings, in which:

FIG. 3 shows the critical partitioning of the ITU-T reference model that facilitates dividing the system without degradation while providing the required application development, circuit and physical mechanical flexibility according to exemplary embodiments of the present invention. A differential configuration is shown in (a) and a single-ended configuration is shown in (b) where "CO" is the Central Office outside plant unshielded twisted pair (UTP), coaxial cable (COAX) or other media entering the premise; "Phone" represents the voice circuit media or wiring within the premise; and "DATA" is associated with the xDSL premise media or wiring. It is this partition technique, while maintaining high signal integrity and performance, that allows for modularization and a broad development flexibility.

FIG. 5 shows detailed block diagrams outlining two (2) of the many active filter and signal enhancement circuits that are deployed within the add-on module according to an exemplary embodiment of the present invention.

FIG. 6 is a physical integrated assembly of the base unit, add-on module and universal mounting bracket according to an exemplary embodiment of the present invention.

DETAILED DESCRIPTION

The present invention will now be described more fully with reference to the accompanying drawings, in which examples of embodiments of the invention are shown. The invention may, however, be embodied in many different forms and should not be construed as being limited to the embodiments set forth therein; rather, these examples of embodiments are provided so that this disclosure will be thorough and complete, and will fully convey the concept of the invention to those skilled in the art.

Figure 1:
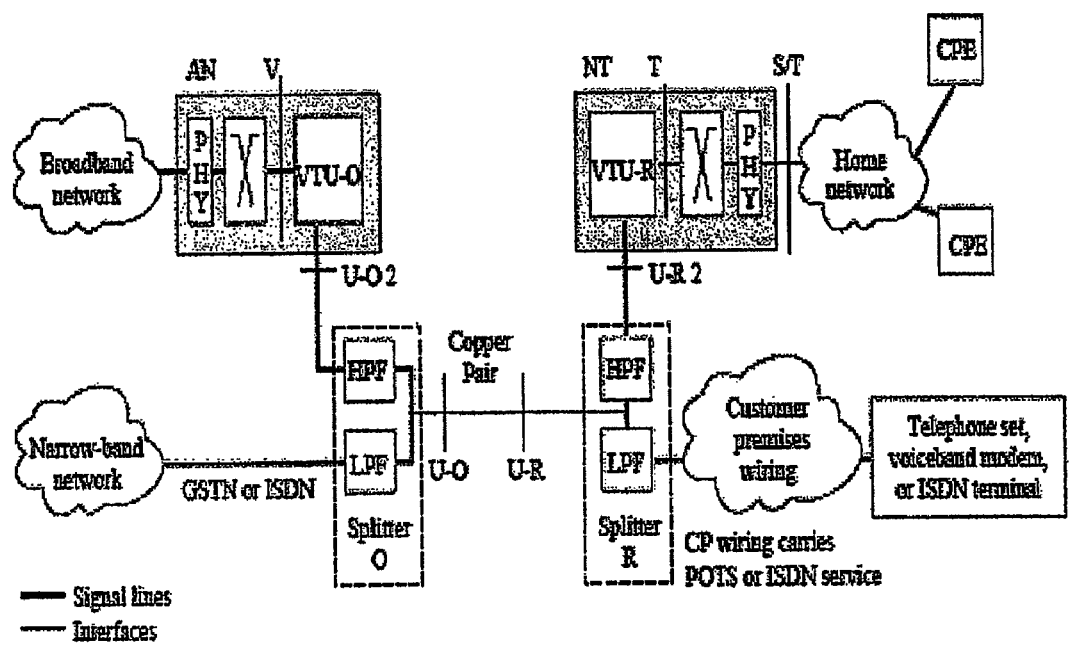
FIG. 1 is a generic application reference model according to ITU-T G.993.2 (02/2006) section 5, subsection 5.4 for remote deployment with splitter showing data service with underlying POTS service.

FIG. 1 is a generic application reference model according to ITU-T G.993.2 (02/2006) section 5, subsection 5.4 for remote deployment with splitter showing data service with underlying POTS service. Data service only and data service with underlying ISDN service application reference models are not shown. Although the diagram refers to the VDSL2 transceiver unit (VTU), a more generic xDSL expression is used herein to encompass all DSL schemes.

Of particular interest is the block labeled "Splitter R" which inter-connects the Central Office "Copper Pair" to the "Customer premise wiring" through a Low Pass Filter (LPF) and the VTU-R (where R is remote) through a High Pass Filter (HPF). The VTU-R is also commonly called the Modem at the customer premise. Designations U-O, U-R, U-R2 refer to interfaces that are defined within the specification. Section 14 "Electrical requirements", and in particular subsection 14.2 "Service Splitters" is left up to developers to further define.

By combining Radio Frequency (RF) design techniques with specially built very low frequency (VLF) through high frequency (HF) Vector Network Analyzer (VNA) test and measurement equipment, it has been discovered that the ITU-T xDSL reference models can be partitioned as shown in FIGS. 3 (a) and (b) without loss of performance or system degradation. If careful consideration of complex impedances over the full frequency band of interest is taken into account, and modern mixed-mode scattering parameter methodologies (M-M S-Par) are employed, full and complete sets of parametric data can be derived for component, board, module and system elements. This comprehensive parametric data is, in turn, used to perform very accurate functional synthesis, circuit design and full system analysis. In accordance with one exemplary embodiment, a particular reference model partitioning could maintain optimum performance while providing a great deal of electrical and mechanical flexibility in development of xDSL splitter-filtering, signal enhancement, mechanical design, physical configuration, and interconnectivity.

Figure 2:
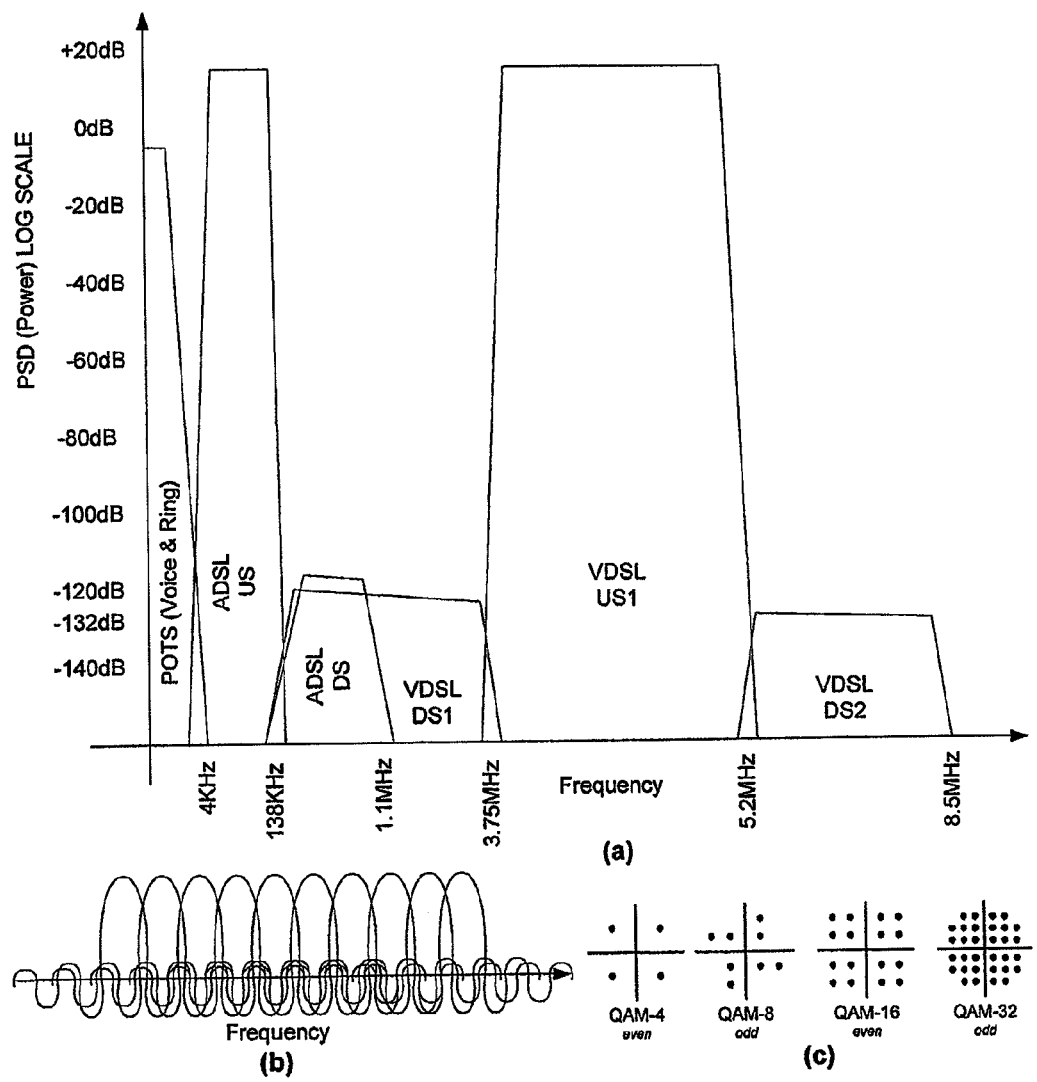
FIG. 2 outlines a related art premise side simplified signal spectral plot of the duplex xDSL signal for typical VDSL2 8a profile (a), a small representative section of the orthogonal channel structure Discrete Multi Tone (DMT) modulation scheme (b), and diagrams of four possible quadrature modulation constellations (c) that each of the possible 512 DMT channels might employ based upon their specific signal to noise ratio (SNR). A full description of all profile DMT structures is found in ITU-T G.993.2.

The design partition complexity of the xDSL bi-directional signal makeup of the example VDSL2 Profile 8a is illustrated in FIG. 2. Briefly the frequency band is sub-divided into a voice band, uplink (US, US1) bands and downlink (DS, DS1, DS2) bands where both ADSL and VDSL2 channels may be present as shown in the Power Spectral Density (PDS) versus Frequency plot in FIG. 2 (a). The system uses an orthogonal channel structure presented in FIG. 2 (b) to save bandwidth and employs quadrature amplitude modulation (QAM) with up to 32 bits per carrier as outlined in constellation diagrams (c). Theoretically, up to 512 channels can be filled with up to 32 bits per channel. Each channel bit fill is known as a "bin," with the maximum fill depending on the individual channel signal to noise ratio (SNR). This feature distinguishes xDSL Discrete Multi Tone (DMT) modulation from Orthogonal Frequency Division Multiplexing (OFDM) modulation which employs only a fixed Bin. DMT requires critical signal levels, demanding phase preservation and very good noise performance to ensure optimum system operation.

FIGS. 3 (a) and (b) show simplified diagrams for optimized partitioning of the xDSL reference model according to an exemplary embodiment of the present invention. This partitioning includes PSTN twisted pair interconnect terminal 104, surge protection device 106, xDSL profile filter 206, low pass voice band filter 108, data interconnect 210, POTS interconnect 110, matching capacitors 202/204 and Auxiliary (AUX) Board 209.

As an example of this partition, consider in FIG. 3 (a); where the add-on module 200 uses Aux Board 209 with a straight-through connection; thus profile filter 206 output is balanced and interconnect 210 would provide differential interconnects 231 and 232. In FIG. 3 (b) the Aux Board 208 consists of a balanced to unbalanced conversion device (Balun) such that interconnect 210 provides a single-ended interconnect 230. As a further example; consider a profile board 206 providing a high pass filter (HPF) function with cut off frequency of 25 KHz followed by an Aux Board 208 containing a Balun. Although technically complex to develop, these straight forward examples emphasize the valuable features of this partitioning approach. The voice filter and xDSL filter can now be co-located and provide independent functions which, in turn, separate the base unit from the add-on module, allowing a great deal of flexibility and savings in electrical and mechanical development, manufacture, distribution, warehousing, system deployment and re-configuration.

Figure 4:
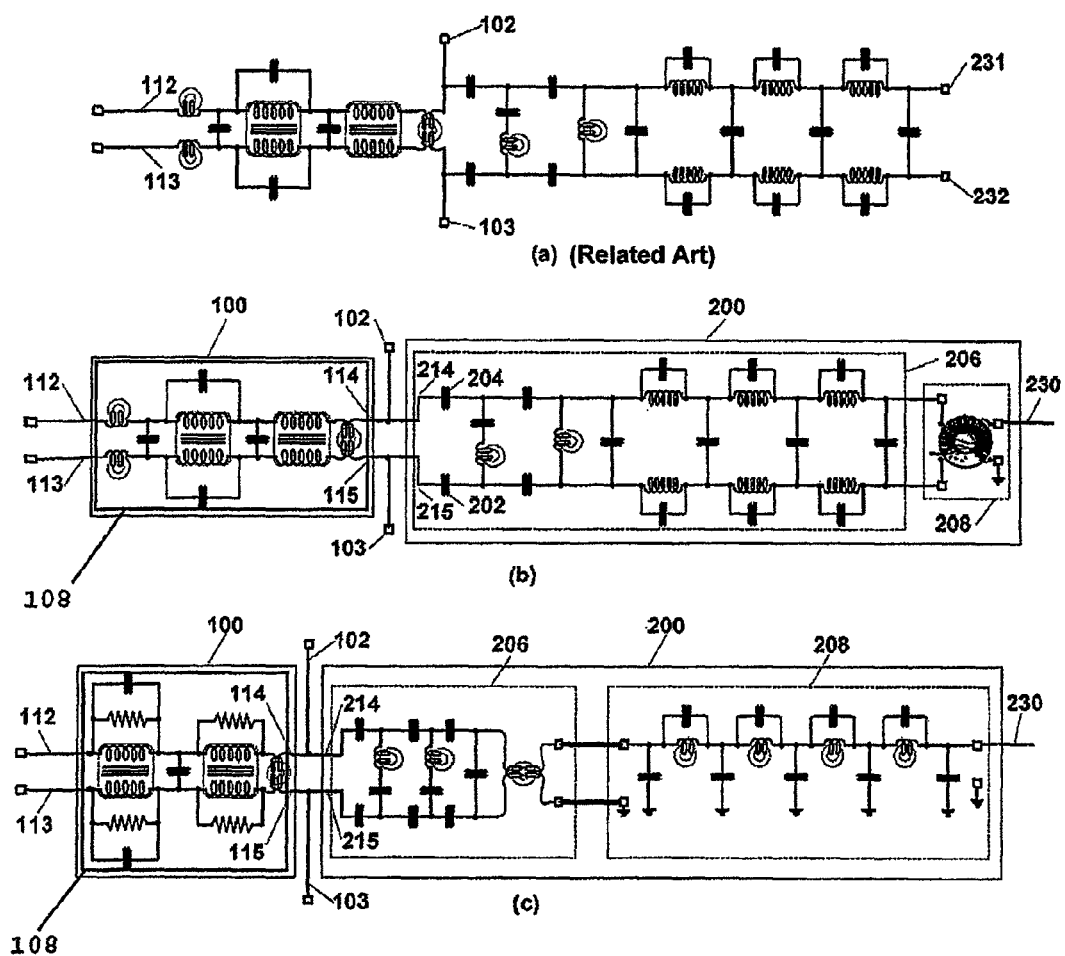
FIG. 4 includes three (3) example simplified schematics of passive element differential and single-ended splitter-filter circuits according to exemplary embodiments of the present invention.

In FIGS. 4 (a)-(c), several examples of passive circuit configurations of the splitter-filter and splitter-filter-balun are shown. FIG. 4(a) presents the schematic of a high performance balanced xDSL profile filter topology with differential interconnect without partitioning. UTP POTS xDSL signal interconnects at 102/103 and is internally connected with the voice filter and xDSL data profile filter. This configuration is typical of related art devices.

FIG. 4 includes three (3) example simplified schematics of passive element differential and single-ended splitter-filter circuits according to exemplary embodiments of the present invention. A typical fixed configuration, dual wide NID slot, single fixed housing, differential splitter-filter is shown in (a); the same circuit topology is shown in (b), however the circuit is partitioned and includes an added balanced to unbalanced (Balun) circuit transformation device providing single-ended interconnect. A third partitioned topology is shown in (c) where the xDSL filter interconnect is single-ended.

One example of partitioning is illustrated in FIG. 4 (b) where CO POTS interconnects 102/103 with the base unit 100, housing the voice filter 108, at 114/115 and interconnects with add-on module 200 at 214/215. Internal to the add-on module 200 is an xDSL Profile Board 206 and balun Axu Board 208 with single-ended data interconnect 230. Another high performance splitter circuit with similar voice filtering 108 housed in the base unit 100 is shown in FIG. 4 (c), however, this xDSL profile filter uses a different topology with differing characteristics where a balanced first filter section 206 is combined with a single-ended second filter section 208 providing a single-ended interconnect 230.

The splitter circuit configuration in an exemplary embodiment of the present invention is designed to support a functional partition whereby a main assembly base unit supports functions that are common to all xDSL profile configurations and an add-on module further supports functions that are specific to particular xDSL profiles and enhancements. Individual and separate interface and interconnect functions are also supported.

In an exemplary embodiment, functions that are common to all xDSL profile configurations include the PSTN twisted pair interconnect 104 with terminals 102/103; a surge protection device 106, if required; a low pass voice band filter 108, and a POTS wiring interconnect 110 and terminals 112/113.

One exemplary embodiment of the present invention includes a passive xDSL splitter-filter assembly 200 including an xDSL Profile Board 206, data Interconnect type 210 with physical interconnect means that are plugged onto the common base unit 100 assembly to form a complete splitter. This splitter circuit can contain any combination of profile, interface, and interconnect, as required by the application or installation. For example, if a premise contained only usable twisted pair wire or only usable coaxial cable, during installation the technician could choose an add-on module with the appropriate interconnect, or, if the current distribution media in use were to become non-operable, only an add-on module Interconnect 210 change would be required to interface with a different distribution media type. A further example, if a premise were located some distance from the CO, a receive signal amplifier splitter-filter combination add-on module 200 could be deployed in place of the original splitter-filter. Or, if a local radio station or other source were causing excessive interference within the xDSL band, a notch filter Add-on Module might be deployed at the time of the installation, or, as an upgrade or repair.

FIGS. 5(a) and (b) include the use of active components to achieve xDSL profile filtering and other performance enhancements according to another exemplary embodiment of the present invention. The integrated active circuit and support components reside within the add-on module 200 and make use of the module interconnects 104 via interconnects 114/214, 115/215 and 210.

FIG. 5 (a) is an integrated active xDSL profile filter 540 with a means of receiving external power either from the CO POTS interconnect 104/620 or through premise wiring interconnect 210/610/622 by employing on-board Power Taps and selectively routing the power source by an on-board switch 630. Power is currently provided on the POTS system along with the voice and xDSL data signal through interconnects 214 and 215. Premises side power is made available by adding a power source within the Premises and super-imposing a voltage 610 onto the xDSL premises data signal wiring and interconnect 230.

FIG. 5 (b) shows an integrated active xDSL profile filter with noise mitigation and xDSL signal gain boost features 570. This circuit is powered from the CO or the Premises using similar methods as those previously described for FIG. 5 (a). Additional features include remote programming and monitoring capability, enhanced internal power control and transmit power monitoring.

The circuits shown in FIGS. 4 (a)-(c) employ passive components and, as such, do not require an external power source and are not capable of electronic signal amplification whereas the circuits of FIGS. 5 (a) and (b) employ integrated active components and, as such, do require an external power source and are capable of electronic signal amplification and other sophisticated xDSL signal manipulations.

One exemplary embodiment of the present invention involves active circuitry, external powering, location of the xDSL add-on module 200 remote from the base unit 100 while interconnecting and programming the same through any technically appropriate means. The method of attachment and interconnection of the module onto the assembly or remotely interconnecting the assembly to the module without degradation of performance is accomplished by ensuring proper match conditions between the devices while considering the medium, for example coaxial cable or balanced twisted pair wires, Ethernet cable, magnetic inductive coupling, optical coupling or electromagnetic radiation coupling.

FIG. 6 (a) shows assembly of the base unit, add-on module and universal mounting bracket according to another exemplary embodiment of the present invention. This combined assembly, or parts thereof, have been successfully tested to properly fit and secure within these NID enclosures: AFL (Keptel) SNI-4300 w/K-footprint without recess; AFL (Keptel) SNI-4600 w/K-footprint without recess; Tyco/AFL (Keptel) SNI-4300 w/S-footprint—need to use Adapter; Tyco/AFL (Keptel) SNI-4600 w/S-footprint—using the bracket; Corning (Siecor) CAC 7300 (S-footprint)—using the bracket; Corning (Siecor) CAC 7600 (S-footprint)—using the bracket; Corning (Universal) UNI 3003—using the bracket; Corning (Universal) UNI 3006—using the bracket. The above NID group represents the vast majority of NID enclosures currently installed in the field.

FIGS. 6 (a) and (b) illustrate another exemplary embodiment, and include a base unit 100 with internal and external features that provide a means to mechanically and electrically connect the base unit 100 to the NID 400 enclosure and corresponding telephone network connections as well as the connections to the add-on module 200.

Figure 12:
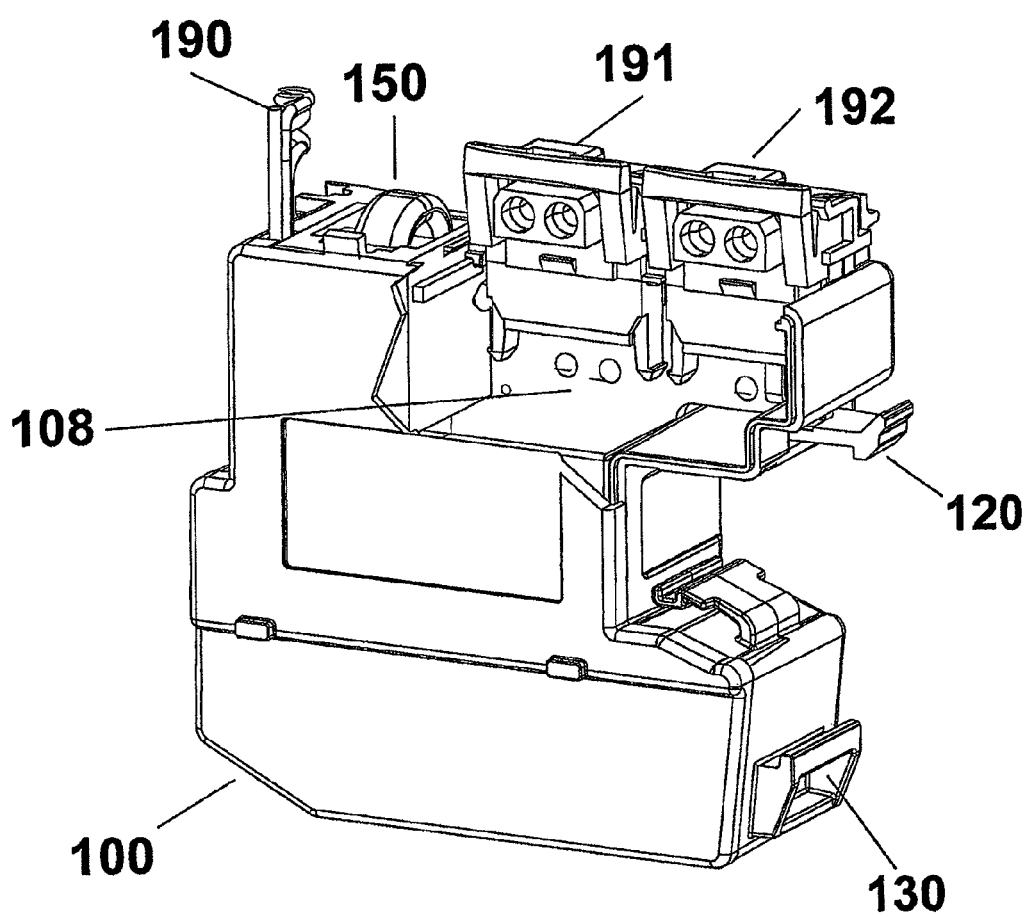
FIG. 12 provides a base unit cut-away left view exposing part of the internal circuit board assembly with differential insulation displacement connector attachment locations according to an exemplary embodiment of the present invention.

FIGS. 6-9 illustrate examples of embodiments of the present invention where features including the interconnects 102, 103 and 190 from the PCB 108 shown in FIG. 12 inside the base unit 100 that connects to the external network wiring present in the NID 400. Also present are one or more insulation displacing connectors (IDCs) 191 and 192 with openings 112, 113, 114 and 115 for interconnects from the add-on module 200 to electrically connect to the base unit 100. The base unit 100 includes an RJ cable 150 coming from inside the base unit 100 from the PCB 108, wherein the RJ cable 150 connects to the female RJ connector used for testing the base unit and the signal coming from the Central Office (CO).

Figure 9:
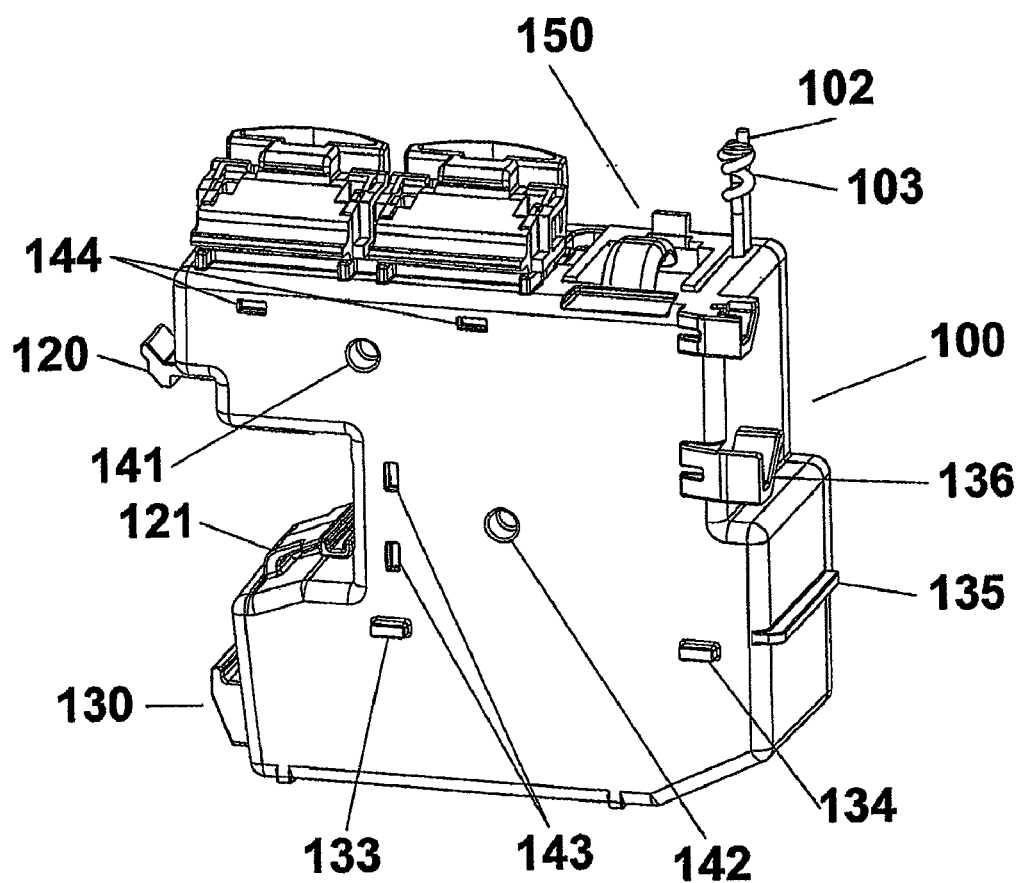
FIG. 9 is the base unit mechanical diagram right view according to an exemplary embodiment of the present invention.
Figure 10:
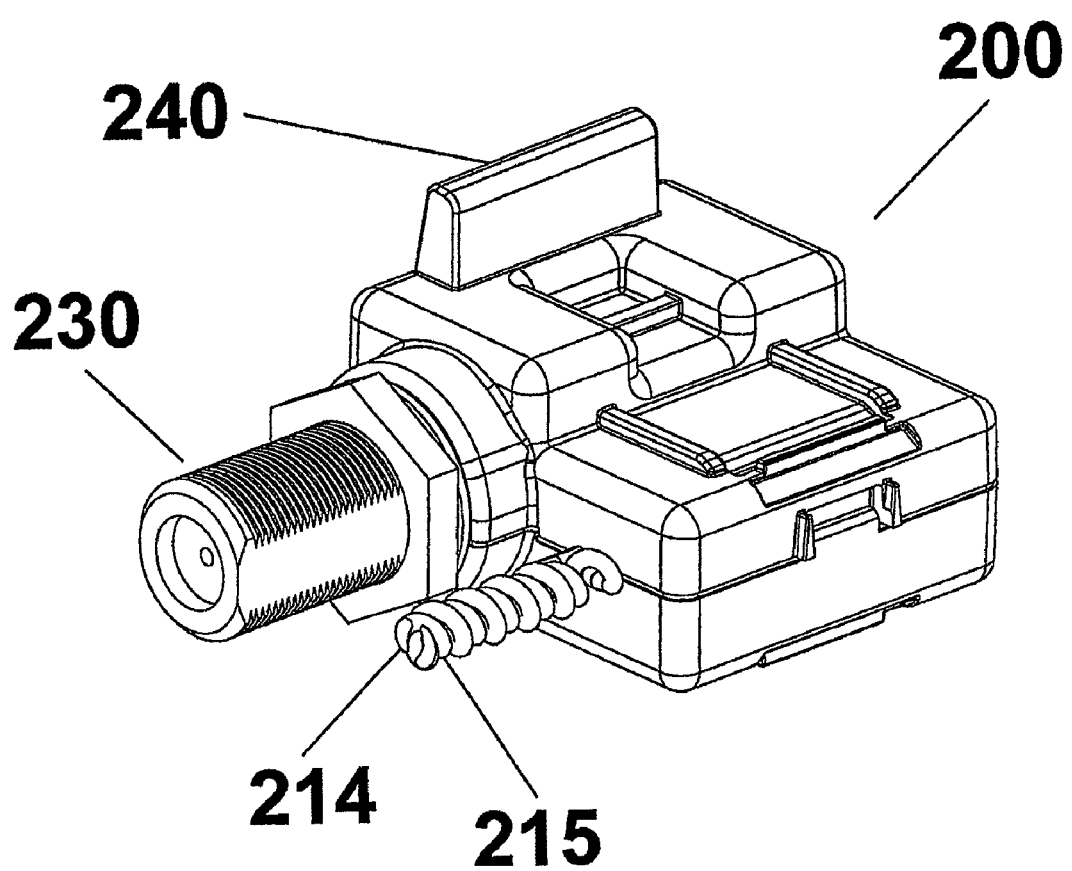
FIG. 10 illustrates the add-on module configured with a coaxial cable F-Connector premise wiring interconnect and UTP wire base unit interconnect according to an exemplary embodiment of the present invention.
Figure 13:
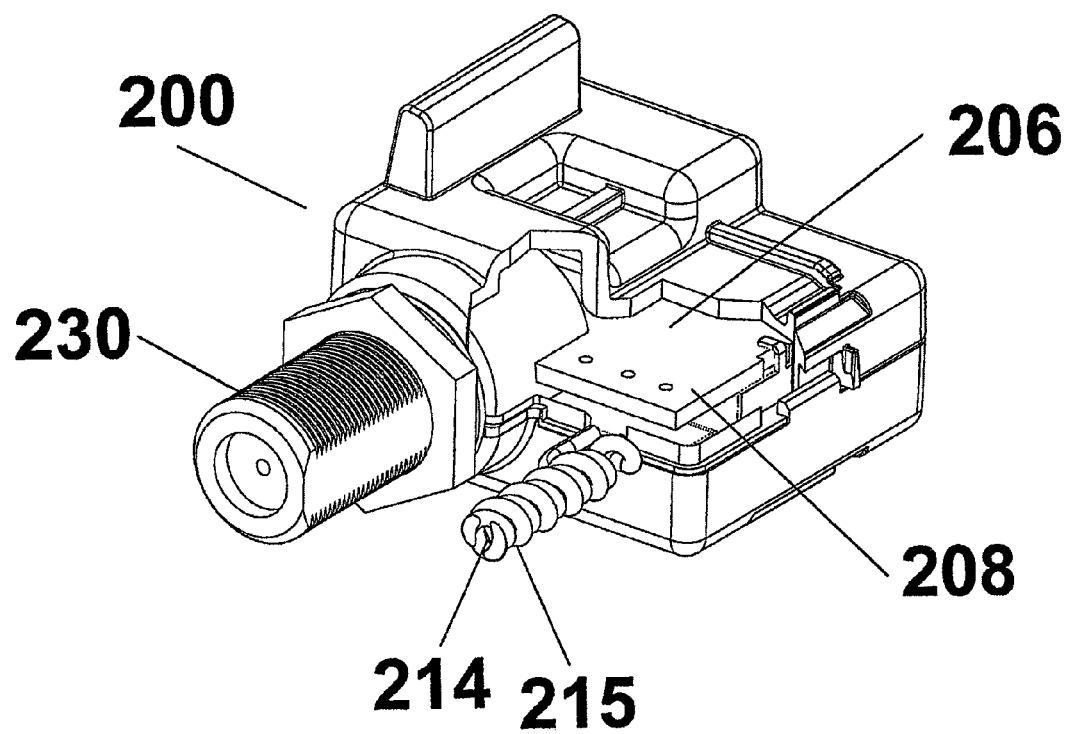
FIG. 13 provides a add-on module cut-away view revealing a two layer stacked circuit board assembly with UTP wire interconnect, F-Connector interconnect and balun shield housing according to an exemplary embodiment of the present invention.

An example of the add-on module 200 is illustrated in FIG. 10 and FIG. 13, and is mechanically mounted to the base unit 100 in any of three different orientations. In the first two mounting orientations the add-on module 200 is secured to the base unit 100 by snap fit hook 120 and 121 of the base unit 100. The difference being the two mountings is the orientation of the connector 230 with respect to the orientation of the base unit 100 inside the NID 400 enclosure. The base unit 100 is engineered to interface with features within the NID 400 so as to provide a way to mount the base unit 100 in many different NID 400 styles from multiple manufacturers. Some of these features are shown in FIG. 9.

For example, a receiving catch 130 of the base unit 100 engages a hook type feature common to the "K" style footprint NID 400 enclosures and rotates via an axis normal to the front plane of the base unit 100 and the base unit 100 is seated in the NID 400 until one or more attachment arms 136 of the base unit 100 body are secured and received by the mating interface features in the NID 400. Depending on the particular NID 400 into which the base unit 100 is installed, the orientation of the base unit 100 can be either as shown in FIG. 9 or it can be rotated 180 degrees about a vertical axis normal to the base of the NID 400 and installed into same or similar type features commonly known to anyone skilled in the art. When the latter mounting is used, the add-on module is rotated 180 degrees about the horizontal axis and is installed with the connector 230 pointing in the opposite direction when the add-on module is coupled to the hooks 120 and 121. In other words, in one exemplary embodiment, the add-on module 200 can be oriented to accommodate the various alignments of the base unit 100 within the NID 400.

In one exemplary embodiment, the add-on module 200 can also be mounted on the side of the base unit 100 as shown in FIG. 6 (b) by engaging the mounting ear 240 on the add-on module 200 with the catch 130 on the base unit 100 and rotating it counter clockwise (CCW) until the add-on module snaps into position with the hook 120 on the base unit 100. The add-on module 200 includes external interconnects 214 and 215, as shown in FIG. 13, coming from PCB 206 to make electrical connections with the base unit 100.

Figure 14:
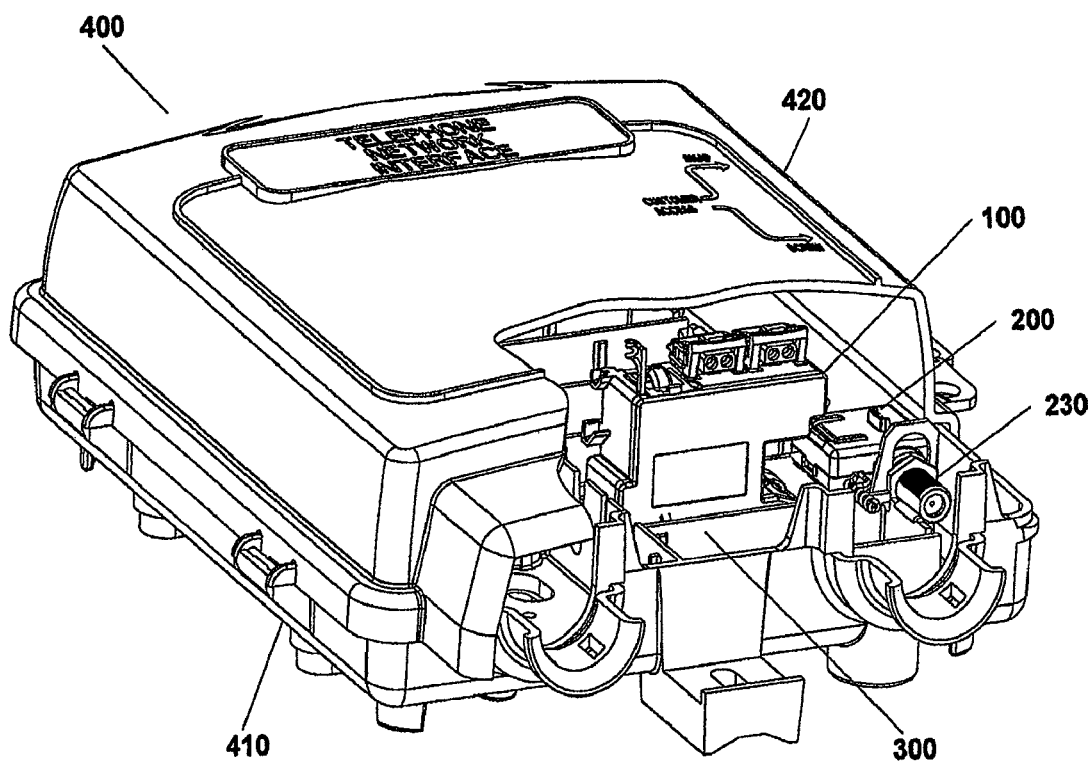
FIG. 14 illustrates a typical NID enclosure single line slot application with cut-away view to show installed base unit, add-on module and universal mounting bracket according to an exemplary embodiment of the present invention.
Figure 15:
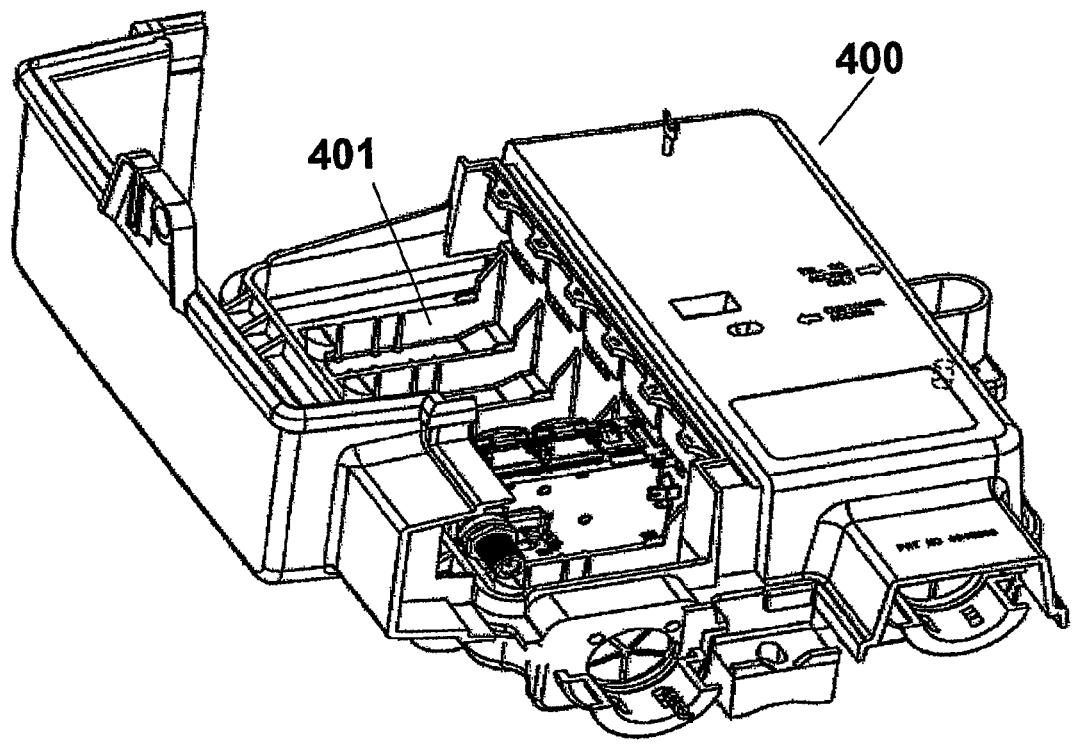
FIG. 15 illustrates another view of a typical NID enclosure single line slot application with cut-away view to show installed base unit, add-on module and universal mounting bracket according to an exemplary embodiment of the present invention.

In one exemplary embodiment, the base unit 100 also includes anti-rotation features 143 and 144 along with mounting bosses 141 and 142 that provide a way to connect auxiliary mounting brackets and devices, which can be used to mount optional hardware as needed for present and future requirements. The base unit 100 also includes support features 131, 132, 133 and 134, shown in FIG. 8 and FIG. 9, that are used when mounting the base unit 100 with the universal mounting bracket 300 shown in FIG. 11. In one exemplary embodiment, the base unit 100 can also be installed into an "S" style NID 400 by the addition of the universal mounting bracket 300 shown in FIGS. 14 and 15, and if required by field technicians it may also be used in the Universal style NID 400 enclosure.

Figure 11:
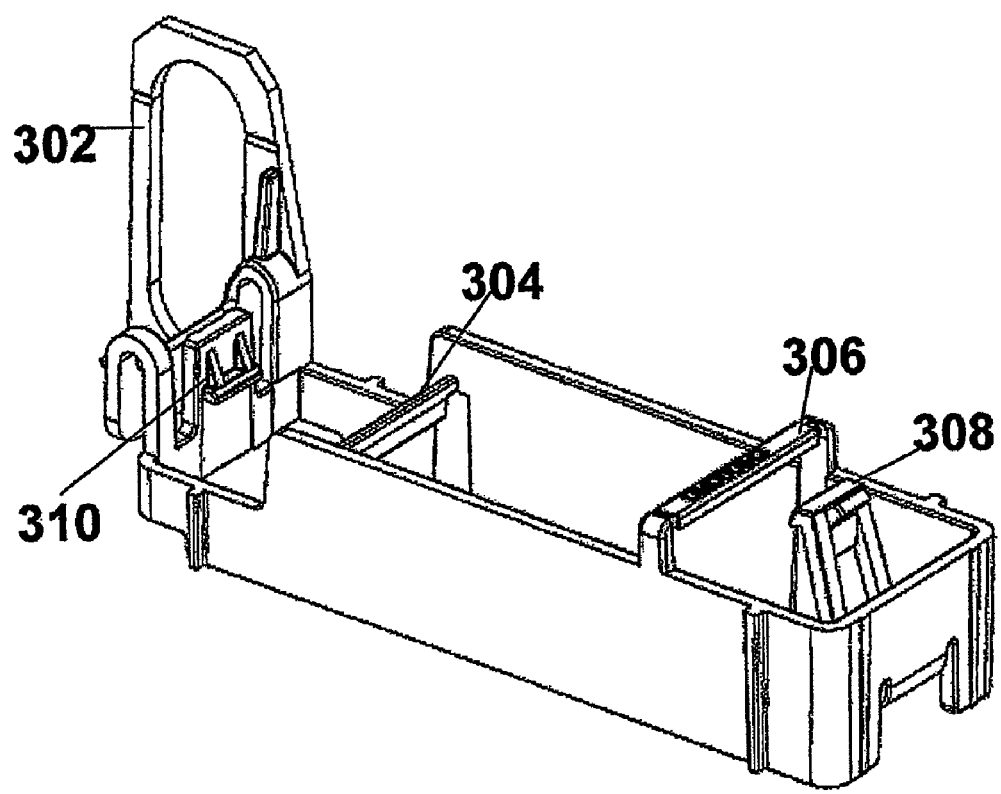
FIG. 11 illustrates the universal mounting bracket with all break-away components in place according to an exemplary embodiment of the present invention.

An example of a universal mounting bracket 300 shown in FIG. 11 can be used to mount base unit 100 and add-on module 200 within a single line space of the NID 400. The universal mounting bracket 300 is secured within the NID by, for example, protrusion like features with undercut formed heads commonly referred to as snap fits.

There are a multiple arrangements in which the base unit 100 may be mounted into the universal mounting bracket 300. Various arrangements may be accomplished by removing one or more cross bars 304 and 306. Cross bars 304 and 306 may be removed, for example, using tools or by hand. Various arrangements are necessary to provide flexibility when positioning the base unit 100 (or base unit 100 and the mounting bracket 300) within the NID. Typically, there are two compartments on a NID, Telco side and Customer side. The network module is usually installed on the Customer side. However, some suppliers have the Customer side on the left, some on the right. Thus, the flexibility to orient the network module allows the network module to be installed in various styles of NIDs.

FIG. 6 (*a*) shows one example of an arrangement where the base unit 100 is positioned in the universal mounting bracket 300 by removing the cross bar link 306. The catch feature 130 of the base unit 100 is engaged with the bar 304 of the universal mounting bracket 300. The base unit 100 is then rotated counter clockwise, away from the vertical flange 302 of the universal mounting bracket 300 until rib feature 135 of the base unit 100 snaps into position under the snap finger hook 308 of the universal mounting bracket 300.

Figure 7:
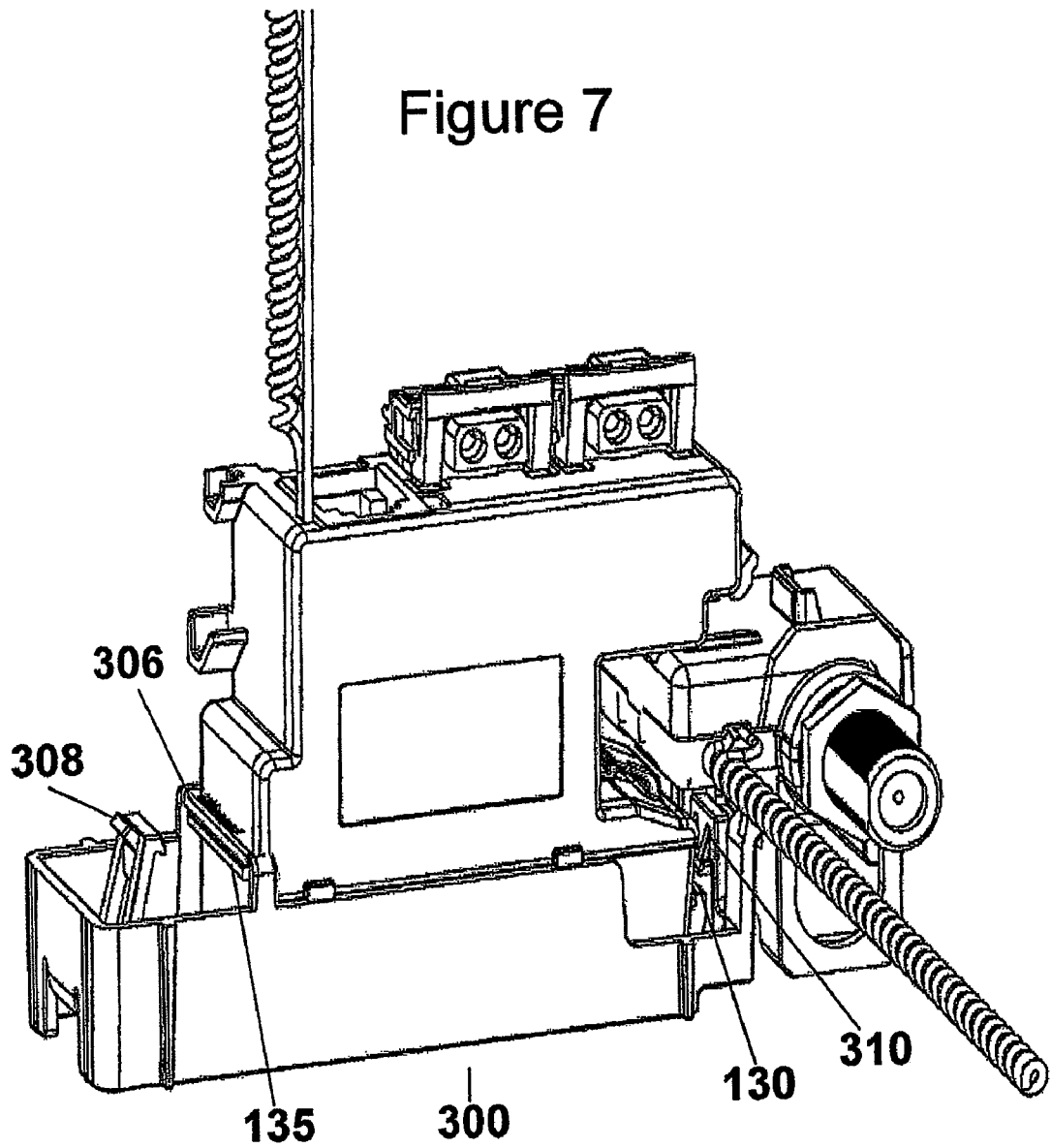
FIG. 7 shows a physical integrated assembly of the base unit, add-on module and universal mounting bracket according to another exemplary embodiment of the present invention.
Figure 8:
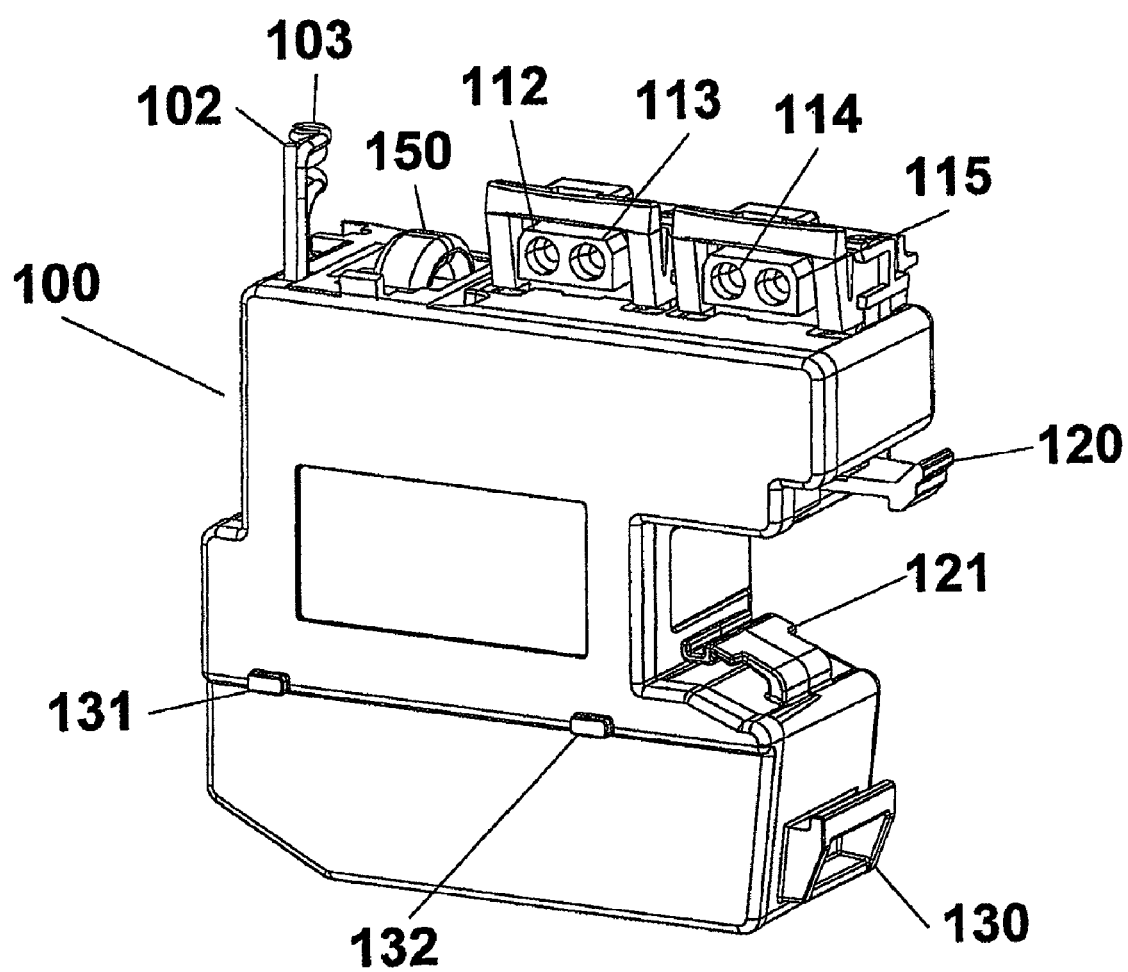
FIG. 8 shows the base unit mechanical diagram left view according to an exemplary embodiment of the present invention.

FIG. 7 illustrates another exemplary embodiment, wherein the base unit 100 may be arranged within the universal mounting bracket 300 in a second position by removing cross bar 304. In this arrangement, catch piece 135 of the base unit 100 is engaged with the bar 306 and hooks underneath the crossbar 306. The base unit 100 is then rotated counter clockwise into the universal mounting bracket 300 until catch feature 130 snaps into position under snap-finger 310 securing the base unit 100 in place. These two arrangements of the base unit 100 within the universal mounting bracket 300 position the base unit 100 in locations from left to right inside the NID 400, and provide options for the field technician to facilitate the installation of the coax cable connection. For example, different arrangements may be needed when clearing modules within the NID 400 when there is limited access is limited because of other adjacent modules also within the NID 400, or if the case 410 and cover 420 generate geometry constraints.

When installing the base unit 100 into the universal bracket 300 as discussed above, the add-on module 200 may be attached to the base unit 100. However, in one exemplary embodiment, the add-on module 200 may be detached from the base unit 100 and independently mounted into the universal mounting bracket 300. For example, the add-on module 200 may be detached from the base unit 100 in order to vertically adjust the position of the add-on module 200 with respect to the base unit 100. Such a vertical adjustment of the add-on unit 200 may be needed when using an F-connector 230, or when clearing other modules or devices within the NID 400, but is not limited to these reasons.

To facilitate attaching of the add-on module 200, the universal mounting bracket 300 may contain a vertical flange 302 with an open slot as shown in FIG. 11. The connector 230 may be inserted into the flange 302 to allow the add-on module 200, for example, to be coupled with cable and/or wiring inside of the NID 400. The add-on module 200 may be further secured with a jam nut supplied as part of the add-on module 200 or left loose to maximize cable routing options within the NID 400 in order to minimize bend radius attenuation of the fiber optic cable.

The vertical flange 302 of the universal mounting bracket 300 may also be detached form the universal bracket 300. Detaching the flange 302 may be performed for numerous reasons, such as, for example, providing mobility to field technicians when faced with space constraints. Likewise, flange 302 may also include a breakaway feature at the top which can be removed, for example, to install coax cable to the add-on module 200 outside of the NID 400.

The universal mounting bracket 300 may contain holes, additional mounting brackets, or provide strain relief of any wiring or cables coming from or to the base unit 100, the add-on module 200, or the combination of the two. For example, such modifications may be needed to mount additional devices or to facilitate network connection installations.

Figure 16:
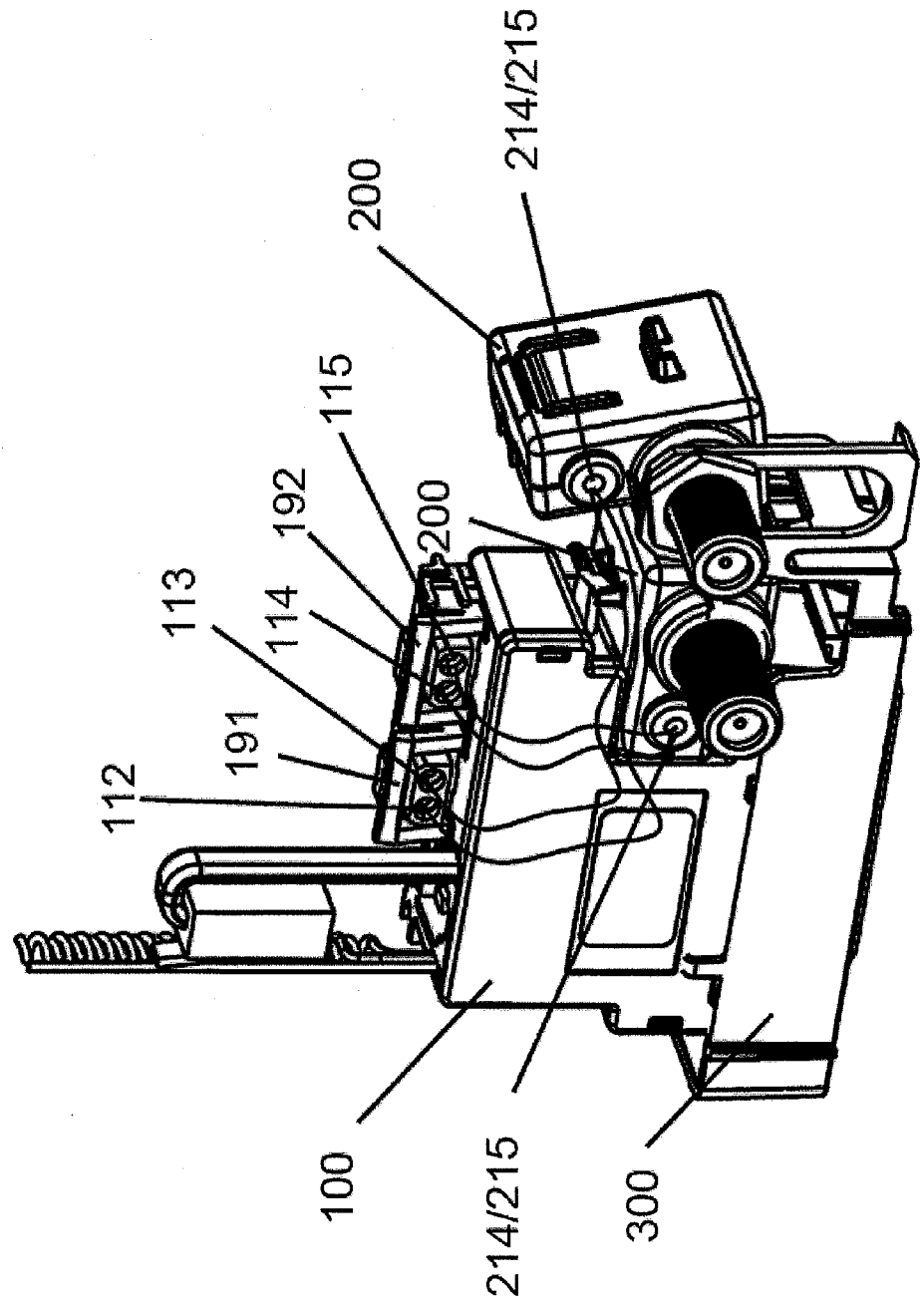
FIG. 16 is a physical integrated assembly of the base unit, two add-on modules and universal mounting bracket according to an exemplary embodiment of the present invention.

FIG. 16 is a physical integrated assembly of the base unit, two add-on modules and universal mounting bracket according to an exemplary embodiment of the present invention. In particular, FIG. 16 shows two add-on modules 200 independently connected to the base unit 100 in parallel. A first add-on module 200 may be connected to the base unit 100 as described according to FIG. 6(*a*) and a second add-on module 200 may be connected to the universal mounting bracket 300 via the flange 302 as described according to FIGS. 7 and 11. Each add-on module 200 includes a pair of external interconnects 214/215 to be connected to openings 112-115 of the insulation displacing connectors (IDC's) 191 and 192, respectively. Thus, the first add-on module 200 is eclectically connected to IDC 192 and the second add-on module 200 is electrically connected to IDC 191. This allows two independent add-on modules 200 (e.g., filters) to be connected in parallel to the base unit 100. Thus, the circuit in the base unit 100 could be partitioned, for example, to be a diplexer. Accordingly, each base unit output could require an impedance conversion.

Figure 17:
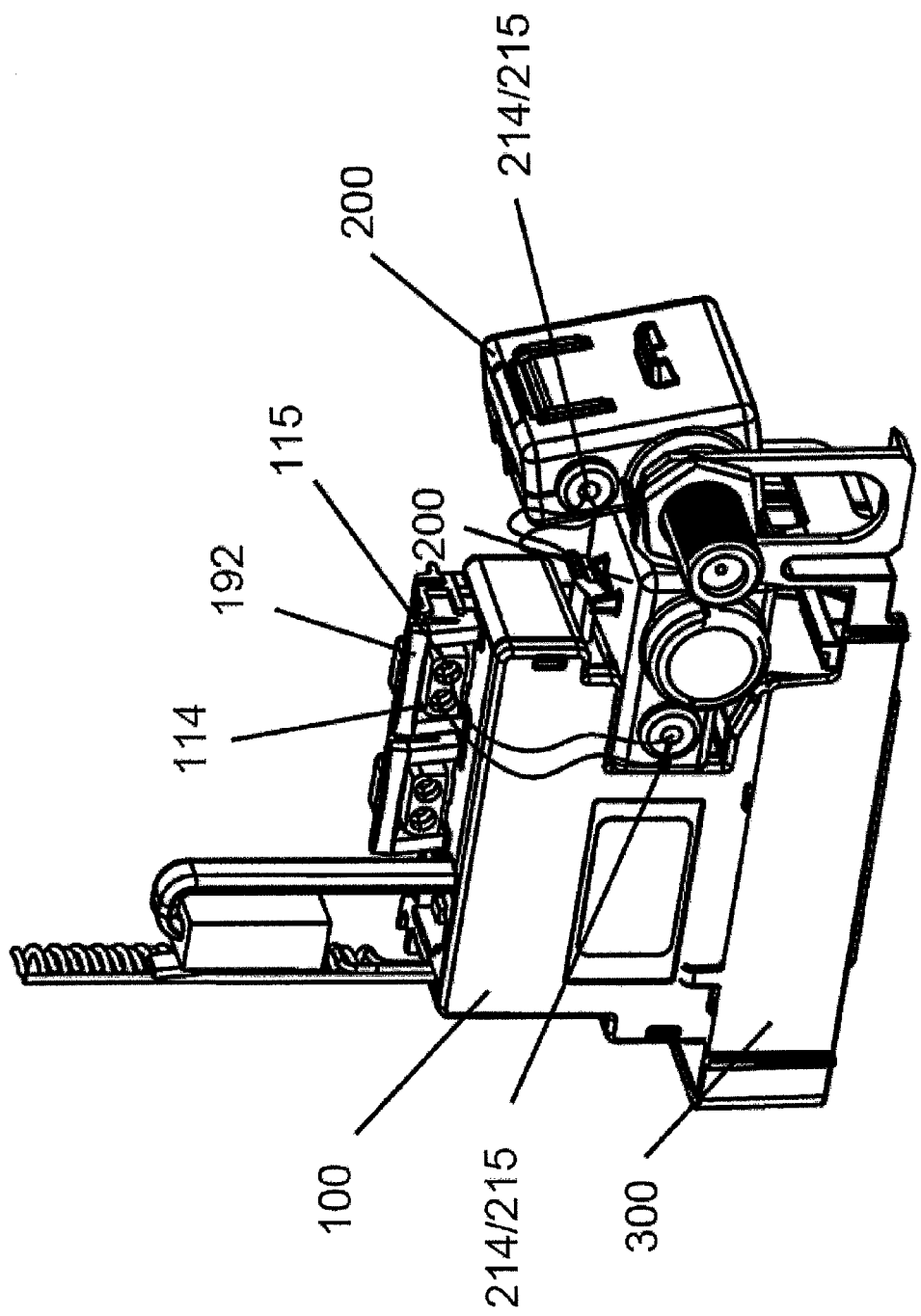
FIG. 17 is a physical integrated assembly of the base unit, two add-on modules and universal mounting bracket according to another exemplary embodiment of the present invention.

FIG. 17 is a physical integrated assembly of the base unit, two add-on modules and universal mounting bracket according to another exemplary embodiment of the present invention. The integrated assembly of FIG. 17 is similar to that of FIG. 16, except the base unit 100, the first add-on module 200 and the second add-on module 200 are connected in series. Thus, the external interconnects 214/215 of the first add-on module 200 are connected to the openings 114/115 of the IDC 192, and the external interconnects 214/215 of the second add-on module 200 are connected a connector of the first add-on module 200. Thus, the first add-on module 200 (e.g., a noise filter) could be added to the output of a base unit 100 before it is routed to the second add-on module (e.g., a balun) for impedance conversion.

Numerous modifications may be made to the examples of embodiments of the present invention discussed above without departing from the spirit and scope of the present invention as defined by the following claims.

What is claimed is:

1. A universal adapter bracket comprising:
   a first portion containing at least two mounting elements, wherein the at least two mounting elements engage with a base unit of a network module to configure the base unit within the first portion of the bracket,
   wherein the at least two mounting elements comprise a first cross bar, a first snap hook, a second cross bar and a second snap hook,
   wherein the first and the second cross bar are both configured to be removable from the bracket, and either the first or the second cross bar is removed from the bracket upon mounting the base unit within the first portion,
   wherein the first snap hook and the first cross bar are disposed on a first side of the first portion, and the second snap hook and the second cross bar are disposed on an opposite side of the first side of the first portion, and
   wherein the first snap hook and the second cross bar or the second snap hook and the first cross are configured to engage with the base unit of the network module.

2. The bracket of claim 1, wherein the bracket is mounted within a network interface device (NID) to interface the base unit with the NID.

3. The bracket of claim 1, wherein the bracket engages with at least one add-on module.

4. The bracket of claim 3, wherein the at least one add-on module is electrically connected to the base unit in one of a series connection configuration and a parallel connection configuration.

5. The bracket of claim 3, wherein a main body of the base unit is connected to an add-on module of the at least one add-on module.

6. The bracket of claim 3, the bracket further comprising a flange, wherein the flange engages with an add-on module of the at least one add-on module.

7. The bracket of claim 6, wherein a main body of the base unit is connected to another add-on module of the at least one add-on module.

8. The bracket of claim 7, wherein the bracket is mounted within a network interface device (NID) to interface the base unit and the at least one add-on module with the NID.

9. The bracket of claim 8, wherein the bracket occupies a single line space of the NID, and mounts the base unit and the at least one add-on module within the single line space.

10. The bracket of claim 7, wherein the add-on module and the other add-on module are electrically connected to the base unit in one of a series connection configuration and a parallel connection configuration, such that, in the series connection configuration, the base unit, the add-on module and the other add-on module are connected in series, and, in the parallel connection configuration, the add-on module and the other add-on module are independently connected to the base unit in parallel.

11. The bracket of claim 8, wherein the flange is detachable from the first portion.

12. The bracket of claim 6, wherein the add-on module is coupled to the base unit.

13. The bracket of claim 6, wherein the flange is configured to vertically adjust a position of the add-on module with respect to the base unit.

14. The bracket of claim 13, wherein a connector of the add-on module is inserted into an open slot of the flange.

15. The bracket of claim 6, wherein an upper portion of the flange is configured to be removable from the flange.

16. The bracket of claim 1, wherein the first portion of the bracket is configured to receive the base unit in one of at least two orientations arranged within the first portion.

17. The bracket of claim 1, wherein the base unit is rotatably coupled to the first snap hook of the first portion of the bracket.

18. A universal adapter bracket comprising:
a first portion comprising mounting elements a first snap hook, a second snap hook, a first removable crossbar and a second removable crossbar, wherein the first snap hook faces the first removable crossbar and the second snap hook faces the second crossbar,
wherein the mounting elements engage with abuse unit of a network module to configure the base unit within the first portion of the bracket, and
wherein one of the first and second crossbars are removed in order to mount the base unit within the first portion of the bracket, and
wherein the first snap hook is disposed on an inner wall of a first transverse side of the first portion, the second snap hook is disposed on an inner wall of a second transverse side of the first portion, the second transverse side being located opposite to the first transverse side,
the first and second removable crossbars are disposed substantially parallel to the first transverse side, the first removable crossbar being disposed closer to the first transverse side than to the second transverse side, and the second removable crossbar being disposed closer to the second transverse side than to the first transverse side,
wherein, when the first removable crossbar is removed from the first portion and the second removable portion remains, the first snap hook and the second removable crossbar engage with the base unit to fix the base unit to the first portion of the bracket, and
when the second removable crossbar is removed from the first portion and the first removable crossbar remains, the second snap hook and the first removable crossbar engage with the base unit to fix the base unit to the first portion of the bracket.

19. The bracket of claim 18, wherein the bracket is mounted within a network interface device (NID) to interface the base unit with the NID.

20. The bracket of claim 18, wherein, when the first removable crossbar is removed from the first portion and the second removable portion remains, the second removable crossbar engages with a catch element of the base unit, such that the catch element is engaged underneath the second removable crossbar, and the first snap hook engages with a rib element of the base unit, such that the rib element is engaged underneath the first snap hook, and
when the second removable crossbar is removed from the first portion and the first removable crossbar remains, the second snap hook engages with the catch element of the base unit, such that the catch element is engaged underneath the second snap hook, and the first removable crossbar engages with the rib element of the base unit, such that the rib element is engaged underneath the first removable crossbar.

21. The bracket of claim 18, wherein the base unit is rotatably coupled to the first snap hook of the first portion of the bracket or the base unit is rotatably coupled to the second snap hook of the first portion of the bracket.

22. A universal adapter bracket comprising:
a first portion containing at least four mounting elements including a first mounting element, a second mounting element, a third mounting element and a fourth mounting element, wherein the first and the second mounting elements are disposed substantially parallel to transverse sides of the first portion, each transverse side respectively containing the third and the fourth mounting elements, and wherein at least two of the first second, third and fourth mounting elements engage with a base unit of a network module to configure the base unit within the first portion of the bracket, and
wherein the first and second mounting elements are removable, and one of the first or second mounting elements is removed from the bracket to configure the base unit into one of two positions within the first portion of the bracket,
wherein the first and third mounting elements are disposed on a first side of the first portion, and the second and fourth are disposed on an opposite side of the first side of the first portion, and
wherein the first and fourth mounting elements or the second and third mounting elements are configured to engage with the base unit of the network module.

23. The bracket of claim 22, wherein the bracket is mounted within a single line space of a network interface device (NID) to interface the base unit with the NID.

24. The bracket of claim 22, wherein the bracket engages with at least one add-on module.

25. The bracket of claim 24, wherein the at least one add-on module is electrically connected to the base unit in one of a series connection configuration and a parallel connection configuration.

26. The bracket of claim 24, further comprising a flange that configures an add-on module of the at least one add-on module within the bracket, and the bracket is mounted within a single line of a network interface device (NID) to interface the base unit and the at least one add-on module with the NID.

27. The bracket of claim 22, wherein the base unit is rotatably coupled to the first or second mounting element.

* * * * *